UNITED STATES PATENT OFFICE.

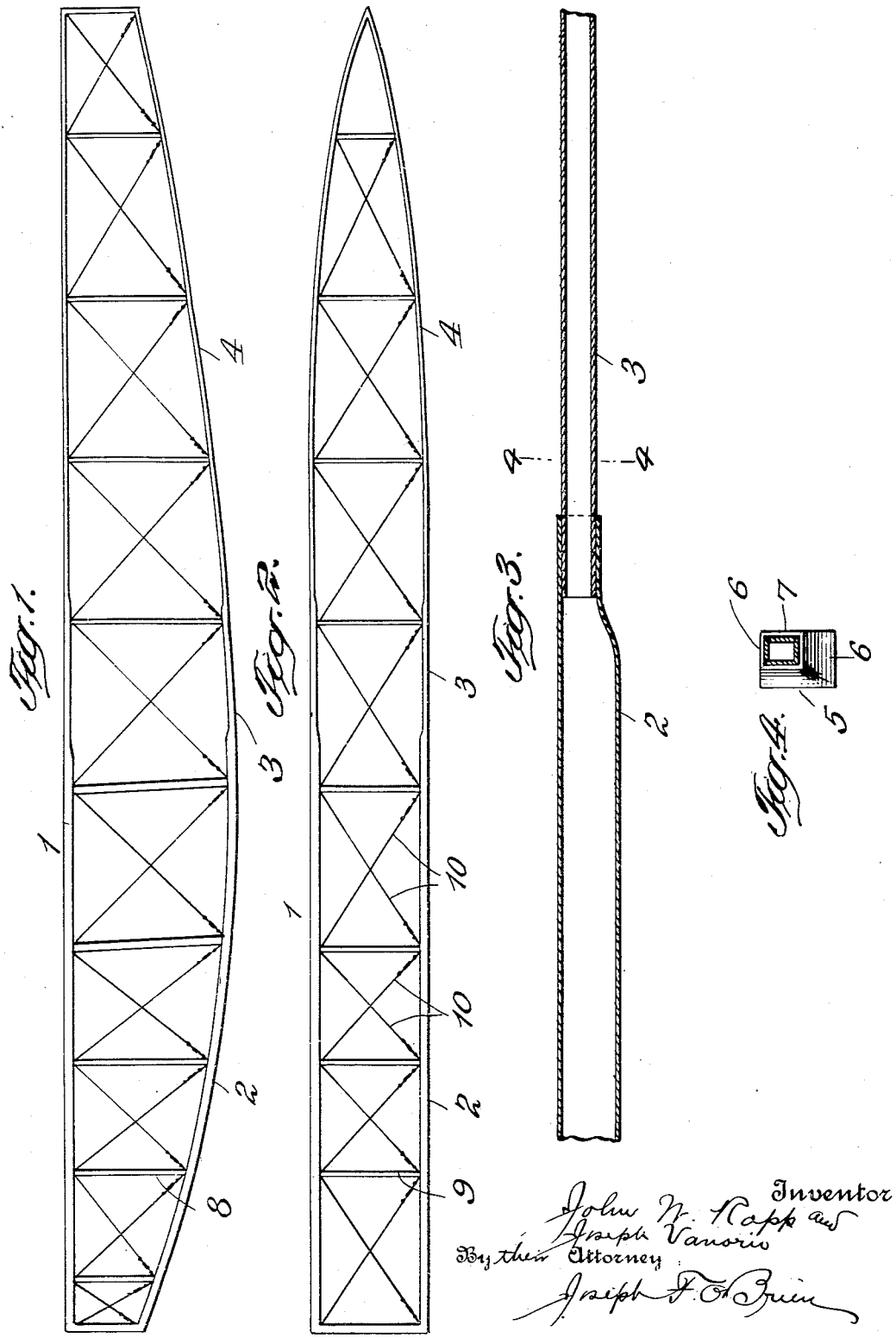

JOHN W. RAPP, OF FLUSHING, AND JOSEPH VANORIO, OF BROOKLYN, NEW YORK; SAID VANORIO ASSIGNOR TO SAID RAPP.

AIRPLANE-FUSELAGE.

1,363,996.    Specification of Letters Patent.    Patented Dec. 28, 1920.

Application filed January 19, 1918. Serial No. 212,782.

*To all whom it may concern:*

Be it known that we, JOHN W. RAPP and JOSEPH VANORIO, both citizens of the United States, and residing respectively, at Flushing and Brooklyn, in the counties of Queens and Kings and State of New York, have invented a new and Improved Airplane-Fuselage, of which the following specification is a full disclosure.

This invention relates to improvements in airplane fuselage construction.

The primary object of our invention is to produce a fuselage frame composed entirely of metal which will be sufficiently light to meet all the weight requirements and will, for a given weight, have a maximum of strength and particularly great torsional strength so as to withstand the immense torsional strains incurred during use and at the same time have a minimum of weight.

In a more intense aspect, our invention contemplates the employment of longérons and struts comprising steel tubes, rectangular and preferably oblong in cross-section, each longéron being composed of a series of sections of varying cross-sectional dimensions and the said sections being telescoped at the joints, a portion of the larger tube being reduced in diameter, and the telescoped portions being securely welded together. In this way, I am enabled to utilize the oblong tubular longérons, which provide a maximum of strength, and at the same time vary the cross-sectional dimensions of the tubes so that that portion of the fuselage which is subjected to the greatest strain may be provided with the heaviest tubing and the size of the tubing may be reduced in proportion to the lessening of the strain exerted thereon in use. For example, longéron tubing of relatively large size and consequent increased weight and strength may be employed at the front of the machine where the engine is located and where the fuselage is subjected to the greatest strain because of the attachment of the wings and running gear, while longéron tubing of relatively small size may be employe at the tail of the fuselage where the strains encountered are lightest, while an intermediate section may have longéron tubing of an intermediate size.

Other objects of our invention will be in part obvious from the accompanying drawings and in part indicated in connection therewith by the following analysis of our invention.

In the accompanying drawings, in which similar reference characters designate corresponding parts throughout the several views:

Figure 1 is a side elevation of a fuselage frame embodying our invention;

Fig. 2 is a plan view of the fuselage frame illustrated in Fig. 1;

Fig. 3 is a longitudinal section of a longéron illustrating the joint employed to connect adjoining sections of the longéron; and Fig. 4 is a section on the line 4—4 of Fig. 3.

Referring now to these drawings 1 indicates a fuselage frame in which the longérons or marginal members are composed, as illustrated, of a plurality of connected sections of varying cross-sectional dimensions, the largest diameter tubing being employed at the section 2 at the front of the machine where the engine is mounted and where the running gear and wings are attached, the next largest size of tubing being employed at the section 3 toward the center of the fuselage where the passenger is usually seated, and the smallest size of tubing being employed at the section 4 at the rear or tail of the machine or fuselage-body where the strains are of diminished intensity.

As illustrated in Figs. 3 and 4, the adjacent longéron sections are telescoped at the joints and securely welded together, so that all tendency to rupture at the joints between the sections of differing cross-sectional dimensions will be avoided. In order to procure a more effective welded joint, I preferably reduce, by drawing, the end of the larger tube adjacent to the joint so that it will fit over the smaller tube snugly and permit a tight welded joint to be made. In so reducing the larger tube, I preferably bend the tube on two sides 5 and 6 only, the opposite sides 6 and 7 being retained in unaltered condition so as to maintain substantially unbroken corner lines for the fuselage body.

The longéron sections, 2, 3 and 4 are connected to corresponding sections by vertical and transverse struts 8 and 9, such struts being securely welded in place at opposite ends whereby box-like frame sections are formed, each of which is suitably reinforced by tension members 10. The vertical and transverse struts are, as aforesaid, also formed of oblong tubes and they are reduced in cross-sectional dimension in accordance with the variation of the longéron sections to which they are applied and welded.

Having described our invention, we claim:

1. A fuselage frame embodying longérons rectangular in cross-section comprising steel tubing; struts of similar conformation and material welded thereto at opposite ends to form box-like sections having flat sustaining surfaces for the outer covering and flush joints between the members, and tension members reinforcing said sections.

2. A fuselage frame embodying longérons comprising steel tubing rectangular in cross-section, each longéron composed of a plurality of sections having varying cross-sectional dimensions connected together by reducing the size of the larger tube section contiguous to the connection and forming a telescoping joint between said larger section and the section of smaller size; struts varying in cross-sectional dimensions welded at their opposite ends to said longérons, the variation in the cross-sectional dimension of the struts being in accordance with the longéron-sections to which they are secured, whereby frame sections of different degrees of weight and rigidity having flush joints between the members thereof are provided; and means for reinforcing such frame sections.

3. A fuselage frame embodying longérons comprising steel tubing rectangular in cross-section, each longéron composed of a plurality of sections having varying diameters connected together, and the larger tube being bent adjacent to the joint at two sides only, the opposite two sides being retained in the same plane, as and for the purpose specified.

In witness whereof we hereunto subscribe our names, as attested by the two subscribing witnesses.

JOHN W. RAPP.
JOSEPH VANORIO.

Witnesses:
W. C. LANGE,
JOSEPH F. O'BRIEN.